United States Patent
Roh et al.

(10) Patent No.: US 9,020,700 B2
(45) Date of Patent: Apr. 28, 2015

(54) LANE TRACKING APPARATUS AND METHOD USING CAMERA DIRECTION CONTROL

(71) Applicant: Electronics and Telecommunications Research Institute, Daejeon (KR)

(72) Inventors: Myung-Chan Roh, Daejeon (KR); Jae-Min Byun, Gyeryong-si (KR); Ki-In Na, Daejeon (KR); Sung-Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 39 days.

(21) Appl. No.: 13/941,480

(22) Filed: Jul. 13, 2013

(65) Prior Publication Data

US 2014/0088830 A1   Mar. 27, 2014

(30) Foreign Application Priority Data

Sep. 27, 2012 (KR) .................. 10-2012-0107729

(51) Int. Cl.
 B62D 6/00 (2006.01)
 B63H 25/02 (2006.01)
 G05D 1/00 (2006.01)
 B60R 1/00 (2006.01)
 G08G 1/16 (2006.01)
 G05D 1/02 (2006.01)
 B62D 1/28 (2006.01)
 B60W 30/12 (2006.01)
 B62D 15/02 (2006.01)
 B60W 10/20 (2006.01)

(52) U.S. Cl.
 CPC ... B60R 1/00 (2013.01); B62D 6/00 (2013.01); G08G 1/167 (2013.01); B60W 2550/146 (2013.01); B60W 2540/18 (2013.01); B60G 2401/142 (2013.01); G05D 1/0246 (2013.01); B62D 1/28 (2013.01); B60W 10/20 (2013.01); B60W 2710/20 (2013.01); B60W 30/12 (2013.01); B60G 2800/24 (2013.01); B60W 2510/20 (2013.01); B60G 2400/824 (2013.01); B60G 2400/41 (2013.01); B60T 2201/08 (2013.01); B60T 2201/089 (2013.01); G06T 2207/30256 (2013.01); B62D 15/025 (2013.01)

(58) Field of Classification Search
 CPC .......... B62D 15/025; B62D 6/00; B62D 1/28; B60R 1/00; G05D 1/0246; B60T 2201/08; B60T 2201/089; G08G 1/167; G06T 2207/30256; B60G 2400/41; B60G 2400/824; B60G 2401/142; B60G 2800/24; B60W 10/20; B60W 30/12; B60W 2510/20; B60W 2540/18; B60W 2550/146; B60W 2710/20
 USPC ............. 701/28, 32.3, 32.4, 41, 49, 300, 469, 701/523; 340/988, 995.25, 995.28; 382/104; 73/117.02
 See application file for complete search history.

(56) References Cited

U.S. PATENT DOCUMENTS 5,892,855 A * 4/1999 Kakinami et al. ............. 382/291
6,321,159 B1 * 11/2001 Nohtomi et al. ................ 701/28

(Continued)

FOREIGN PATENT DOCUMENTS

KR   10-2004-0034243 A   4/2004
KR   10-2012-0008827 A   2/2012

Primary Examiner — Russell Frejd
(74) Attorney, Agent, or Firm — LRK Patent Law Firm (57) ABSTRACT

A lane tracking apparatus and method using camera direction control is provided. The lane tracking apparatus using camera direction control includes a lane recognition unit for obtaining lane information from an image captured and acquired by a camera. A road curvature calculation unit calculates a curvature of a road using the lane information. A camera direction angle control unit controls a direction angle of the camera in consideration of the road curvature.

12 Claims, 4 Drawing Sheets

(56) References Cited

U.S. PATENT DOCUMENTS

| | | | |
|---|---|---|---|
| 7,072,764 B2 * | 7/2006 | Donath et al. | 701/532 |
| 7,206,684 B2 * | 4/2007 | Takeda | 701/70 |
| 7,860,652 B2 * | 12/2010 | Nishida et al. | 701/514 |
| 2007/0225914 A1 * | 9/2007 | Kawazoe et al. | 701/301 |
| 2008/0091318 A1 * | 4/2008 | Deng et al. | 701/41 |

* cited by examiner

LANE TRACKING APPARATUS AND METHOD USING CAMERA DIRECTION CONTROL

CROSS REFERENCE TO RELATED APPLICATIONS

This application claims the benefit of Korean Patent Application No. 10-2012-0107729, filed on Sep. 27, 2012, which is hereby incorporated by reference in its entirety into this application.

BACKGROUND OF THE INVENTION

1. Technical Field

The present invention relates generally to a lane tracking apparatus using camera direction control and, more particularly, to a lane tracking apparatus and method using camera direction control, which can control the direction angle of a camera in consideration of the curvature of a road calculated by recognizing a lane.

2. Description of the Related Art

Recently, as various functionalities of vehicles have been improved, a variety of technologies for enhancing the safety and convenience of a driver and a passenger have been presented. In particular, lane tracking technology for safely maintaining a vehicle within a lane has been commercialized.

In general, in lane tracking technology which allows a vehicle to use information about left and right lanes based on images of a camera, the camera is mounted on the front of the interior of the vehicle or on the rearview mirror of the vehicle, with the direction angle of the camera fixed. This may cause a dangerous situation in which the direction angle of the camera is fixed at a direction identical to the travel direction of the vehicle, and so it is difficult to accurately capture an image of a lane in certain environments, such as a region containing curved roads, thus making it impossible to recognize the lane and to provide a warning to prevent a driver from straying outside a lane.

In lane tracking technology, it is very important to accurately capture an image of a lane, but, as described above, a tracking apparatus that is generally used is problematic in that the direction angle of a camera is fixed, and so it is impossible to accurately capture an image of a lane on a curved road. Actually, it has been verified that a problem a rises in that a plurality of lane tracking apparatuses cannot provide lane tracking on curved roads.

Korean Patent Application Publication No. 2004-0034243 discloses a component for recognizing a lane using images, a component for calculating the slope of the lane using the images, a component for calculating the slope of the lane using the curvature of a road, a component for comparing the slopes with each other, and a component for calculating a final curvature based on the results of the comparison and recognizing the lane using the final curvature.

However, such conventional lane tracking merely discloses technology for recognizing a lane using images and the results of the calculation of a road curvature. Accordingly, the conventional lane tracking technology is problematic in that it is difficult to recognize a lane on a curved road due to the fixed direction angle of a camera, in that the relationship of the setting of the direction angle of the camera with variations in road curvature is not presented in detail, and in that a component for utilizing a Global Positioning System (GPS) during the calculation of the road curvature is neither disclosed nor suggested.

Therefore, in order to accurately recognize a lane on a curved road and exactly track the lane, new lane tracking technology is urgently required which can solve the problem of making it difficult to recognize a lane on a curved road when the direction angle of a camera is fixed, by suitably controlling the direction angle of the camera, can present in detail the relationship of the setting of the direction angle of the camera with variations in the road curvature, can calculate the road curvature using lane information and a GPS, and can prevent the vehicle from straying outside the lane and off the road and track the lane by correcting the steering angle of the vehicle so that the steering angle does not fall out of an angle range preset for the calculated road curvature.

SUMMARY OF THE INVENTION

Accordingly, the present invention has been made keeping in mind the above problems occurring in the prior art, and an object of the present invention is to solve the conventional problem of making it difficult to recognize a lane on a curved road when the direction angle of a camera is fixed, by suitably controlling the direction angle of the camera, thus obtaining lane information from the curved road and tracking the lane.

Another object of the present invention is to more accurately obtain lane information from a curved road and track the lane by controlling the direction angle of a camera so that, as the curvature of a road increases, the direction angle of the camera is set to a larger angle.

A further object of the present invention is to more accurately obtain lane information from a curved road and track the lane by controlling the direction angle of a camera in consideration of the curvature of a road and the steering angle of a vehicle obtained using various sensors.

Yet another object of the present invention is to more accurately obtain lane information from a curved road and track the lane by controlling the direction angle of a camera so that, as the steering angle of a vehicle increases, the camera direction angle is set to a larger angle.

Still another object of the present invention is to more exactly calculate the curvature of a road on a curved road and track the lane by calculating the road curvature using lane information and road information obtained using a GPS.

Still another object of the present invention is to correct the steering angle of a vehicle no that the steering angle does not fall out of an angle range preset for a calculated road curvature, thus preventing the vehicle from straying outside a lane and off a road and accurately tracking the lane.

In accordance with an aspect of the present invention to accomplish the above objects, there is provided a lane tracking apparatus using camera direction control, including a lane recognition unit for obtaining lane information from an image captured and acquired by a camera; a road curvature calculation unit for calculating a curvature of a road using the lane information; and a camera direction angle control unit for controlling a direction angle of the camera in consideration of the road curvature.

Preferably, the camera direction angle control unit may control the direction angle of the camera so that a first camera direction angle, obtained when the road curvature is a first road curvature and based on a travel direction of a vehicle, is set to an angle greater than a second camera direction angle, obtained when the road curvature is a second road curvature smaller than the first road curvature and based on the travel direction.

Preferably, the lane tracking apparatus may further include a vehicle steering angle sensor unit for obtaining a steering angle of the vehicle, wherein the camera direction angle control unit controls the direction angle of the camera in consideration of the road curvature and the steering angle of the vehicle.

Preferably, the camera direction angle control unit may control the direction angle of the camera so that a first camera direction angle, obtained when the steering angle of the vehicle is a first vehicle steering angle and based on the travel direction, is set to an angle greater than a second camera direction angle, obtained when the vehicle steering angle is a second vehicle steering angle smaller than the first vehicle steering angle and based on the travel direction.

Preferably, the lane tracking apparatus may further include a road recognition unit for obtaining road information using a Global Positioning System (GPS), wherein the road curvature calculation unit calculates the road curvature using the lane information and the road information.

Preferably, the lane tracking apparatus may further include a vehicle steering angle correction unit for correcting the steering angle of the vehicle in consideration of the road curvature.

Preferably, the steering angle correction unit may be configured to, when the steering angle of the vehicle falls out of an angle range preset for the calculated road curvature, cornet the steering angle of the vehicle to be within the preset angle range.

Preferably, the camera may be located in a center portion of a front of interior of the vehicle.

Preferably, the vehicle steering angle sensor unit may obtain the steering angle of the vehicle using any one of an absolute encoder, a rotary encoder, a tachometer, and a variable resistor.

In accordance with another aspect of the present invention to accomplish the above objects, there is provided a lane tracking method using camera direction control, including obtaining lane information from an image captured and acquired by a camera; calculating a curvature of a road using the lane information; and controlling a direction angle of the camera in consideration of the road curvature.

Preferably, controlling the direction angle of the camera may be configured to control the direction angle of the camera so that a first camera direction angle, obtained when the road curvature is a first road curvature and based on a travel direction of a vehicle, is set to an angle greater than a second camera direction angle, obtained when the road curvature is a second road curvature smaller than the first road curvature and based on the travel direction.

Preferably, the lane tracking method may further include obtaining a steering angle of the vehicle, wherein controlling the direction angle of the camera is configured to control the direction angle of the camera in consideration of the road curvature and the steering angle of the vehicle.

Preferably, controlling the direction angle of the camera may be configured to control the direction angle of the camera so that a first camera direction angle, obtained when the steering angle of the vehicle is a first vehicle steering angle and based on the travel direction, is set to an angle greater than a second camera direction angle, obtained when the vehicle steering angle is a second vehicle steering angle smaller than the first vehicle steering angle and based on the travel direction.

Preferably, the lane tracking method may further include obtaining road information using a Global Positioning System (GPS), wherein calculating the road curvature is configured to calculate the road curvature using the lane information and the road information.

Preferably, the lane tracking method may further include correcting the steering angle of the vehicle in consideration of the road curvature.

Preferably, correcting the steering angle of the vehicle may be configured to, when the steering angle of the vehicle falls out of an angle range preset for the calculated road curvature, correct the steering angle of the vehicle to be within the preset angle range.

Preferably, the camera may be located in a center portion of a front of interior of the vehicle.

Preferably, obtaining the steering angle of the vehicle may be configured to obtain the steering angle of the vehicle using any one of an absolute encoder, a rotary encoder, a tachometer, and a variable resistor.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

Figure 1:
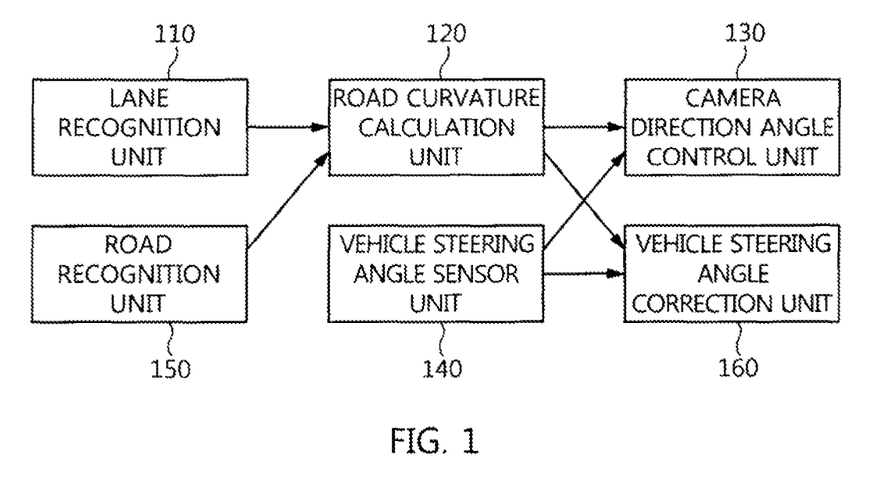
FIG. 1 is a block diagram showing a lane tracking apparatus using camera direction control according to an embodiment of the present invention.

FIG. 1 is a block diagram showing a lane tracking apparatus using camera direction control according to an embodiment of the present invention.

Referring to FIG. 1, the lane tracking apparatus using camera direction control according to an embodiment of the present invention includes a lane recognition unit 110, a road curvature calculation unit 120, and a camera direction angle control unit 130.

Figure 3:
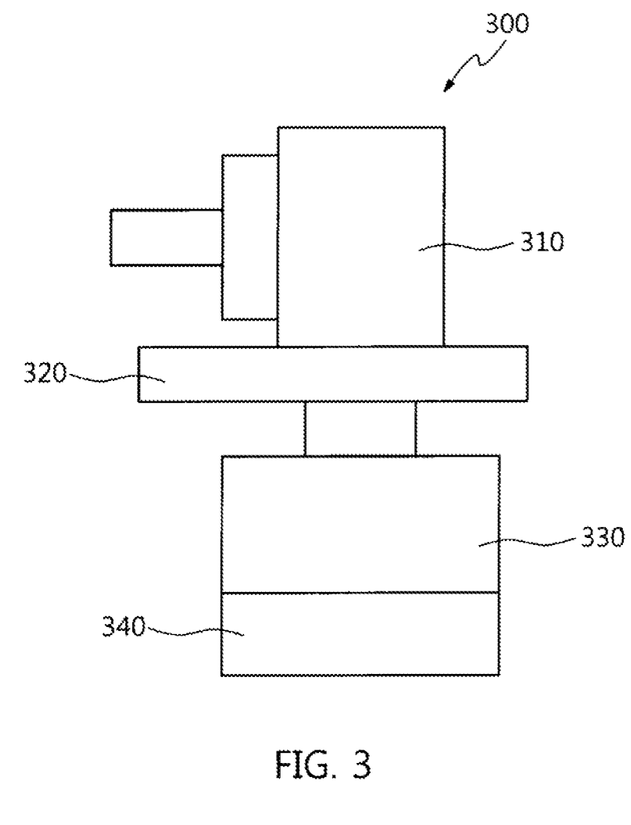
FIG. 3 is a diagram showing an example of an image acquisition unit.

That is, the lane recognition unit 110 obtains lane information from an image captured and acquired by a camera 310 (see FIG. 3). The road curvature calculation unit 120 calculates the curvature of a road using the lane information. The camera direction angle control unit 130 controls the direction angle of the camera in consideration of the road curvature.

Referring to FIG. 3, the lane recognition unit 110 may include an image acquisition unit 300 for acquiring an image using the camera 310 and a control motor 330, and an image processing unit for obtaining lane information by processing the acquired image.

For example, the control motor may be a servo motor.

For example, the lane information may include the tangential direction of a lane, the curvature of the lane, the radius of the lane curvature, etc.

The camera 310 may be located in the center portion of the front of the interior of the vehicle. Further, the camera 310 may be suitably located in light of the rotation thereof caused by the control motor 330. In this regard, the control motor 330 may be freely rotated to the left or right with respect to the travel direction of the vehicle so that it is suitable for capturing an image of the lane.

The image acquisition unit 300 may further include a rotation angle sensor 340 to precisely control the control motor 330.

The image acquisition unit 300 may further include a bracket 320 for connecting the camera 310 to the control motor 330.

The camera direction angle control unit 130 may control the direction angle of the camera so that a first camera direction angle, obtained when the road curvature is a first road curvature and based on the travel direction of the vehicle, is set to an angle greater than a second camera direction angle, obtained when the road curvature is a second road curvature smaller than the first road curvature and based on the travel direction of the vehicle.

For example, the travel direction may be set to a 0 degree which is a reference angle. Further, when the second camera direction angle, obtained when the second road curvature is 0.01/m and based on the travel direction, is 4 degrees, the first camera direction angle, obtained when the first road curvature is 002/m and based on the travel direction, may be 8 degrees.

In another example, when the second camera direction angle, obtained when the second road curvature is 0.02/m and based on the travel direction, is 8 degrees, the first camera direction angle, obtained when the first road curvature is 0.04/m and based on the travel direction, may be 12 degrees.

In this way, as the road curvature increases, the camera direction angle also increases, so that a lane on a curved road may be more accurately recognized. Further, the camera direction angle may be adjusted to a suitable value in consideration of an additional variable so as to accurately recognize a lane.

In addition, the lane tracking apparatus using camera direction control according to the embodiment of the present invention may further include a vehicle steering angle sensor unit 140.

That is, the vehicle steering angle sensor unit 140 may obtain the steering angle of the vehicle, and the camera direction angle control unit 130 controls the direction angle of the camera in consideration of the road curvature and the steering angle of the vehicle.

Figure 4:
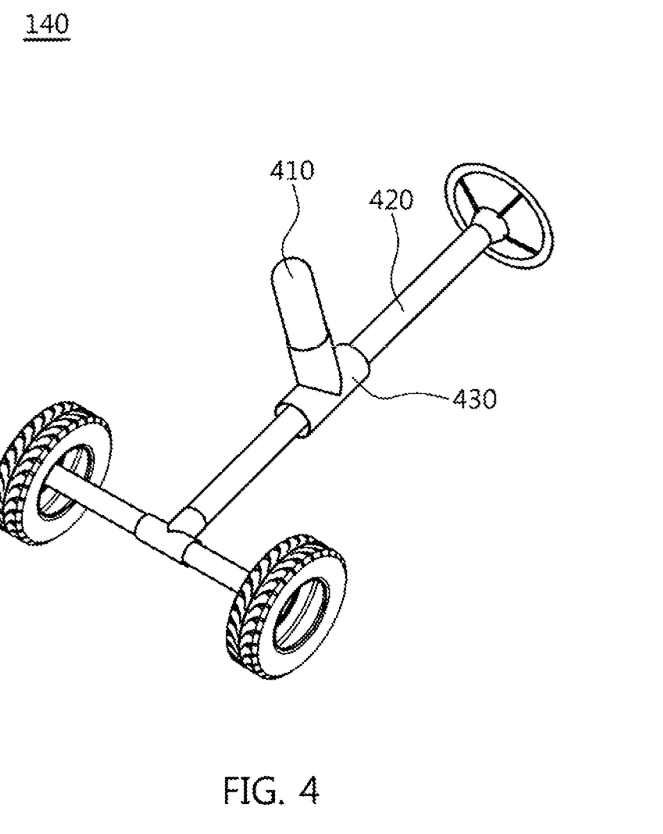
FIG. 4 is a diagram showing an example of the vehicle steering angle sensor unit of FIG. 1.

Referring to FIG. 4, the vehicle steering angle sensor unit 140 may include a sensor 410 for measuring the steering angle of the vehicle, a steering axis 420, and a coupling gear 430 for coupling the steering axis to the sensor.

Here, the vehicle steering angle sensor unit 140 may obtain the steering angle of the vehicle by using any one of an absolute encoder, a rotary encoder, a tachometer, and a variable resistor as the sensor 410.

In this case, the camera direction angle control unit 130 may control the direction angle of the camera so that a first camera direction angle, obtained when the vehicle steering angle is a first vehicle steering angle and based on the travel direction, is set to an angle greater than a second camera direction angle, obtained when the vehicle steering angle is a second vehicle steering angle smaller than the first vehicle steering angle and based on the travel direction.

For example, the travel direction may be set to 0 degree which is a reference angle. Further, when the second camera direction angle, obtained when the second vehicle steering angle is 5 degrees and based on the travel direction, is 4 degrees, the first camera direction angle, obtained when the first vehicle steering angle is 10 degrees and based on the travel direction, may be 8 degrees.

In another example, when the second camera direction angle, obtained when the second vehicle steering angle is 10 degrees and based on the travel direction, is 8 degrees, the first camera direction angle, obtained when the first vehicle steering angle is 15 degrees and based on the travel direction, may be 12 degrees.

In this way, as the vehicle steering angle increases, the camera direction angle also increases, and thus a lane on a curved road may be more accurately recognized. Further, the camera direction angle may be adjusted to a suitable value in consideration of an additional variable so as to accurately recognize a lane.

Meanwhile, the lane tracking apparatus using camera direction control according to the embodiment of the present invention may further include a road recognition unit 150.

That is, the road recognition unit 150 obtains road information using a Global Positioning System (GPS), and the road curvature calculation unit 120 calculates the road curvature using the lane information and the road information.

For example, the lane information may include the tangential direction of a lane, the curvature of the lane, the radius of the lane curvature, etc. The road curvature calculation unit 120 may calculate the road curvature using the lane curvature. Further, the road information may include the location information of the vehicle and the shape of the road, and the road curvature calculation unit 120 may calculate the road curvature using the shape of the road.

Meanwhile, the lane tracking apparatus using camera direction control according to the embodiment of the present invention may further include a vehicle steering angle correction unit 160.

That is, the vehicle steering angle correction unit 160 corrects the steering angle of the vehicle in consideration of the road curvature.

In this case, when the steering angle of the vehicle falls out of an angle range preset for the calculated road curvature, the vehicle steering angle correction unit 160 may correct the steering angle of the vehicle to be within the preset angle range.

For example, the angle range may be a range from 3 degrees to 5 degrees for a calculated road curvature of 0.01/m. When the vehicle steering angle is 6 degrees for the road curvature of 0.01/m and falls out of the angle range, the vehicle steering angle correction unit 160 may correct the vehicle steering angle to an angle of 5 degrees which falls within the angle range from 3 degrees to 5 degrees.

In another example, the angle range may be a range from 7 degrees to 9 degrees for a calculated road curvature of 0.02/m. When the vehicle steering angle is 6 degrees for the road curvature of 0.02/m and falls out of the angle range, the vehicle steering angle correction unit 160 may correct the vehicle steering angle to an angle of 7 degrees which falls within the angle range from 7 degrees to 9 degrees.

In this way, the vehicle steering angle is corrected to be within the angle range preset for the road curvature, thus more accurately tracking the lane on the curved road. Further, the vehicle steering angle may be adjusted to a suitable value in consideration of an additional variable so as to accurately track the lane.

As shown in FIG. 1, the lane recognition unit 110 obtains lane information from the image captured and acquired by the camera 310, and the road recognition unit 150 obtains road information using the GPS. The road curvature calculation unit 120 may calculate the road curvature using the lane information and the road information, and the vehicle steering angle sensor unit 140 obtains the steering angle of the vehicle. Further, the camera direction angle control unit 130 controls the direction angle of the camera in consideration of the road curvature and the vehicle steering angle, and the vehicle steering angle correction unit 160 corrects the steering angle of the vehicle in consideration of the road curvature, with the result that the lane tracking apparatus may track the lane.

Figure 2:
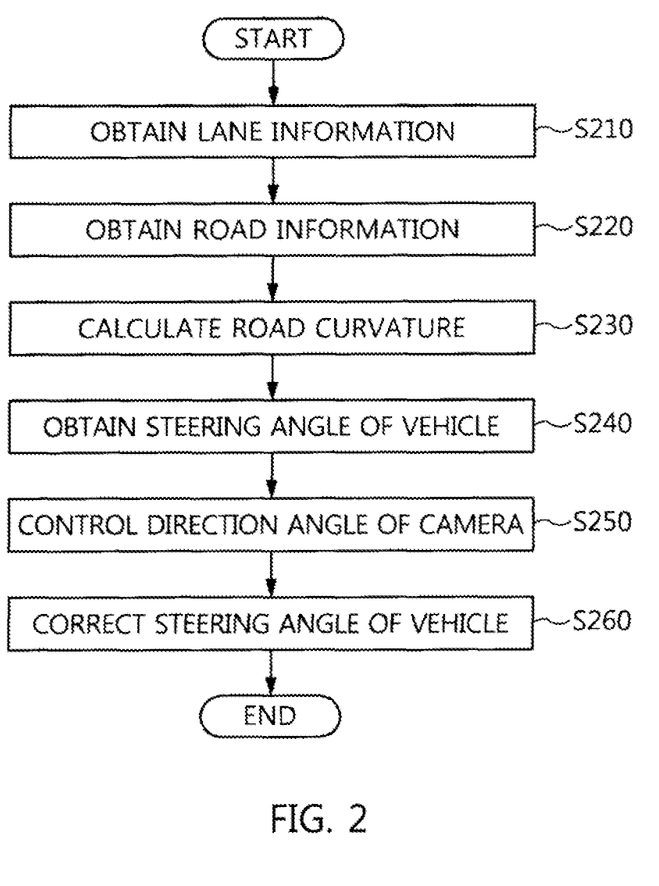
FIG. 2 is an operating flowchart showing a lane tracking method using camera direction control according to an embodiment of the present invention.

FIG. 2 is an operating flowchart showing a lane tracking method using camera direction control according to an embodiment of the present invention.

Referring to FIG. 2, in the lane tracking method using camera direction control according to an embodiment of the present invention, lane information is obtained from an image captured and acquired by the camera 310 at step S210.

In this case, step S210 may include the step of acquiring the image using the camera 310 and the control motor 330, and the step of obtaining the lane information by processing the image.

For example, the control motor may be a servo motor.

For example, the lane information may include the tangential direction of a lane, the curvature of the lane, the radius of the lane curvature, etc.

In this case, the camera 310 may be located in the center portion of the front of the interior of the vehicle. Further, the camera 310 may be suitably located in light of the rotation thereof caused by the control motor 330.

In this regard, the control motor 330 may be freely rotated to the left or right with respect to the travel direction of the vehicle so that it is suitable for capturing an image of the lane.

The image acquisition unit 300 may further include a rotation angle sensor 340 to precisely control the control motor 330.

Here, the image acquisition unit 300 may further include a bracket 320 for connecting the camera 310 to the control motor 330.

Next, in the lane tracking method using camera direction control according to the embodiment of the present invention, road information is obtained using a GPS at step S220.

For example, the road information may include the location information of the vehicle, the shape of a road, etc.

Then, in the lane tracking method using camera direction control according to the embodiment of the present invention, the curvature of a road is calculated using the lane information at step S230. In this case, step S230 may be configured to calculate the road curvature using the lane information and the road information.

For example, the lane information may include the tangential direction of the lane, the curvature of the lane, the radius of the lane curvature, etc. At step S230, the road curvature may be calculated using the lane curvature. Here, the road information may include the location information of the vehicle and the shape of the road, and step S230 may be configured to calculate the road curvature using the shape of the road.

Next, in the lane tracking method using camera direction control according to the embodiment of the present invention, the steering angle of the vehicle is obtained at step S240.

In this case, at step S240, the vehicle steering angle may be obtained by using any one of an absolute encoder, a rotary encoder, a tachometer, and a variable resistor as the sensor 410.

Next, in the lane tracking method using camera direction control according to the embodiment of the present invention, the direction angle of the camera is controlled in consideration of the road curvature at step S250.

In this case, at step S250, the direction angle of the camera may be controlled such that a first camera direction angle, obtained when the road curvature is a first road curvature and based on the travel direction of the vehicle, is set to an angle greater than a second camera direction angle, obtained when the road curvature is a second road curvature smaller than the first road curvature and based on the travel direction.

For example, the travel direction may be set to a 0 degree which is a reference angle. Further, when the second camera direction angle, obtained when the second road curvature is 0.01/m and based on the travel direction, is 4 degrees, the first camera direction angle, obtained when the first road curvature is 0.02/m and based on the travel direction, may be 8 degrees.

In another example, when the second camera direction angle, obtained when the second road curvature is 0.02/m and based on the travel direction, is 8 degrees, the first camera direction angle, obtained when the first road curvature is 0.04/m and based on the travel direction, may be 12 degrees.

In this way, as the road curvature increases, the direction angle of the camera increases, and so a lane on a curved road may be more accurately recognized. Further, the camera direction angle may be adjusted to a suitable value in consideration of an additional variable so as to accurately recognize the lane.

Here, at step S250, the direction angle of the camera may be controlled in consideration of the road curvature and the vehicle steering angle. In this case, at step S250, the camera direction angle may be controlled such that a first camera direction angle, obtained when the vehicle steering angle is a first vehicle steering angle and based on the travel direction, is set to an angle greater than a second camera direction angle, obtained when the vehicle steering angle is a second vehicle steering angle smaller than the first vehicle steering angle and based on the travel direction.

For example, the travel direction may be set to 0 degree which is a reference angle. Further, when the second camera direction angle, obtained when the second vehicle steering angle is 5 degrees and based on the travel direction, is 4 degrees, the first camera direction angle, obtained when the first vehicle steering angle is 10 degrees and based on the travel direction, may be 8 degrees.

In another example, when the second camera direction angle, obtained when the second vehicle steering angle is 10 degrees and based on the travel direction, is 8 degrees, the first camera direction angle, obtained when the first vehicle steering angle is 15 degrees and based on the travel direction, may be 12 degrees.

In this way, as the vehicle steering angle increases, the camera direction angle also increases, and thus a lane on a curved road may be more accurately recognized. Further, the camera direction angle may be adjusted to a suitable value in consideration of an additional variable so as to accurately recognize the lane.

Next, in the lane tracking method using camera direction control according to the embodiment of the present invention, the vehicle steering angle is corrected in consideration of the road curvature at step S260.

In this case, at step S260 is configured to, when the vehicle steering angle falls out of an angle range preset for the calculated road curvature, to correct the vehicle steering angle to be within the angle range.

For example, the angle range may be a range from 3 degrees to 5 degrees for a calculated road curvature of 0.01/m. When the vehicle steering angle is 6 degrees for the road curvature of 0.01/m and falls out of the angle range, step S260 may be configured such that the vehicle steering angle is corrected to an angle of 5 degrees which falls within the angle range from 3 degrees to 5 degrees.

In another example, the angle range may be a range from 7 degrees to 9 degrees for a calculated road curvature of 0.02/m. When the vehicle steering angle is 6 degrees for the road curvature of 0.02/m and falls out of the angle range, step S260 may be configured such that the vehicle steering angle is corrected to an angle of 7 degrees which falls within the angle range from 7 degrees to 9 degrees.

In this way, the vehicle steering angle is corrected to be within the angle range preset for the road curvature, thus more accurately tracking a lane on a curved road. Further, the vehicle steering angle may be adjusted to a suitable value in consideration of an additional variable so as to accurately track the lane.

FIG. 3 is a diagram showing an example of the image acquisition unit 300.

Referring to FIG. 3, the image acquisition unit 300 includes a camera 310 and a control motor 330.

In this case, the camera 310 may be located in the center portion of the front of the interior of the vehicle. Further, the camera 310 may be suitably located in light of the rotation thereof caused by the control motor 330.

Here, the control motor 330 may be freely rotated to the left or right with respect to the travel direction of the vehicle so that it is suitable for capturing an image of the lane.

For example the control motor may be a servo motor.

The image acquisition unit 300 may further include a rotation angle sensor 340 to precisely control the control motor 330.

In this case, the image acquisition unit 300 may further include a bracket 320 for connecting the camera 310 to the control motor 330.

FIG. 4 is a diagram showing an example of the vehicle steering angle sensor unit 140 shown in FIG. 1.

Referring to FIG. 4, the vehicle steering angle sensor unit 140 shown in FIG. 1 may include a sensor 410 for measuring the steering angle of a vehicle, a steering axis 420, and a coupling gear 430 for coupling the steering axis to the sensor.

The vehicle steering angle sensor unit 140 may obtain the vehicle steering angle by using any one of an absolute encoder, a rotary encoder, a tachometer, and a variable resistor as the sensor 410.

As described above, the present invention may solve the conventional problem of making it difficult to recognize a lane on a curved road when the direction angle of a camera is fixed, by suitably controlling the direction angle of the camera, thus obtaining lane information from the curved road and tracking the lane.

Further, the present invention may more accurately obtain lane information from a curved road and track the lane by controlling the direction angle of a camera so that, as the curvature of a road increases, the direction angle of the camera is set to a larger angle.

Furthermore, the present invention may more accurately obtain lane information from a curved road and track the lane by controlling the direction angle of a camera in consideration of the curvature of a road and the steering angle of a vehicle obtained using various sensors.

Furthermore, the present invention may more accurately obtain lane information from a curved road and track the lane by controlling the direction angle of a camera so that, as the steering angle of a vehicle increases, the camera direction angle is set to a larger angle.

Furthermore, the present invention may more exactly calculate the curvature of a road on a curved road and track the lane by calculating the road curvature using lane information and road information obtained using a GPS.

Furthermore, the present invention may correct the steering angle of a vehicle so that the steering angle does not fall out of an angle range preset for a calculated road curvature, thus preventing the vehicle from straying outside a lane and off a road and accurately tracking the lane.

As described above, in the lane tracking apparatus and method using camera direction control according to the present invention, the configurations and schemes in the above-described embodiments are not limitedly applied, and some or all of the above embodiments can be selectively combined and configured so that various modifications are possible.

What is claimed is:

1. A lane tracking apparatus using camera direction control, comprising:
   a lane recognition unit for obtaining lane information from an image captured and acquired by a camera;
   a road curvature calculation unit for calculating a curvature of a road using the lane information;
   a camera direction angle control unit for controlling a direction angle of the camera in consideration of the road curvature; and
   a vehicle steering angle sensor unit for obtaining a steering angle of the vehicle,
   wherein the camera direction angle control unit controls the direction angle of the camera so that a first curvature-related camera direction angle, obtained when the road curvature is a first road curvature and based on a travel direction of a vehicle, is set to an angle greater than a second curvature-related camera direction angle, obtained when the road curvature is a second road curvature smaller than the first road curvature and based on the travel direction,
   wherein the camera direction angle control unit controls the direction angle of the camera in consideration of the road curvature and the steering angle of the vehicle, and
   wherein the camera direction angle control unit controls the direction angle of the camera so that a first steering-related camera direction angle, obtained when the steering angle of the vehicle is a first vehicle steering angle and based on the travel direction, is set to an angle greater than a second steering-related camera direction angle, obtained when the vehicle steering angle is a second vehicle steering angle smaller than the first vehicle steering angle and based on the travel direction.

2. The lane tracking apparatus of claim 1, further comprising a road recognition unit for obtaining road information using a Global Positioning System (GPS),
   wherein the road curvature calculation unit calculates the road curvature using the lane information and the road information.

3. The lane tracking apparatus of claim 2, further comprising a vehicle steering angle correction unit for correcting the steering angle of the vehicle in consideration of the road curvature.

4. The lane tracking apparatus of claim 3, wherein the steering angle correction unit is configured to, when the steering angle of the vehicle falls out of an angle range preset for the calculated road curvature, correct the steering angle of the vehicle to be within the preset angle range.

5. The lane tracking apparatus of claim 4, wherein the camera is located in a center portion of a front of interior of the vehicle.

6. The lane tracking apparatus of claim 5, wherein the vehicle steering angle sensor unit obtains the steering angle of the vehicle using any one of an absolute encoder, a rotary encoder, a tachometer, and a variable resistor.

7. A lane tracking method using camera direction control, comprising:
    obtaining lane information from an image captured and acquired by a camera;
    calculating a curvature of a road using the lane information;
    controlling a direction angle of the camera in consideration of the road curvature; and
    obtaining a steering angle of the vehicle,
    wherein controlling the direction angle of the camera is configured to control the direction angle of the camera so that a first curvature-related camera direction angle, obtained when the road curvature is a first road curvature and based on a travel direction of a vehicle, is set to an angle greater than a second curvature-related camera direction angle, obtained when the road curvature is a second road curvature smaller than the first road curvature and based on the travel direction,
    wherein controlling the direction angle of the camera is configured to control the direction angle of the camera in consideration of the road curvature and the steering angle of the vehicle, and
    wherein controlling the direction angle of the camera is configured to control the direction angle of the camera so that a first steering-related camera direction angle, obtained when the steering angle of the vehicle is a first vehicle steering angle and based on the travel direction, is set to an angle greater than a second steering-related camera direction angle, obtained when the vehicle steering angle is a second vehicle steering angle smaller than the first vehicle steering angle and based on the travel direction.

8. The lane tracking method of claim 7, further comprising obtaining road information using a Global Positioning System (GPS),
    wherein calculating the road curvature is configured to calculate the road curvature using the lane information and the road information.

9. The lane tracking method of claim 8, further comprising correcting the steering angle of the vehicle in consideration of the road curvature.

10. The lane tracking method of claim 9, wherein correcting the steering angle of the vehicle is configured to, when the steering angle of the vehicle falls out of an angle range preset for the calculated road curvature, correct the steering angle of the vehicle to be within the preset angle range.

11. The lane tracking method of claim 10, wherein the camera is located in a center portion of a front of interior of the vehicle.

12. The lane tracking method of claim 11, wherein obtaining the steering angle of the vehicle is configured to obtain the steering angle of the vehicle using any one of an absolute encoder, a rotary encoder, a tachometer, and a variable resistor.

* * * * *